Nov. 10, 1931.                E. R. KAST                1,831,497
              SIGNATURE ASSEMBLING AND STITCHING MACHINE
                 Filed Aug. 5, 1929      7 Sheets-Sheet 1

Fig. 1.

Inventor
Edward R. Kast.
By
Cameron, Kerkam & Sutton.
                                       Attorneys

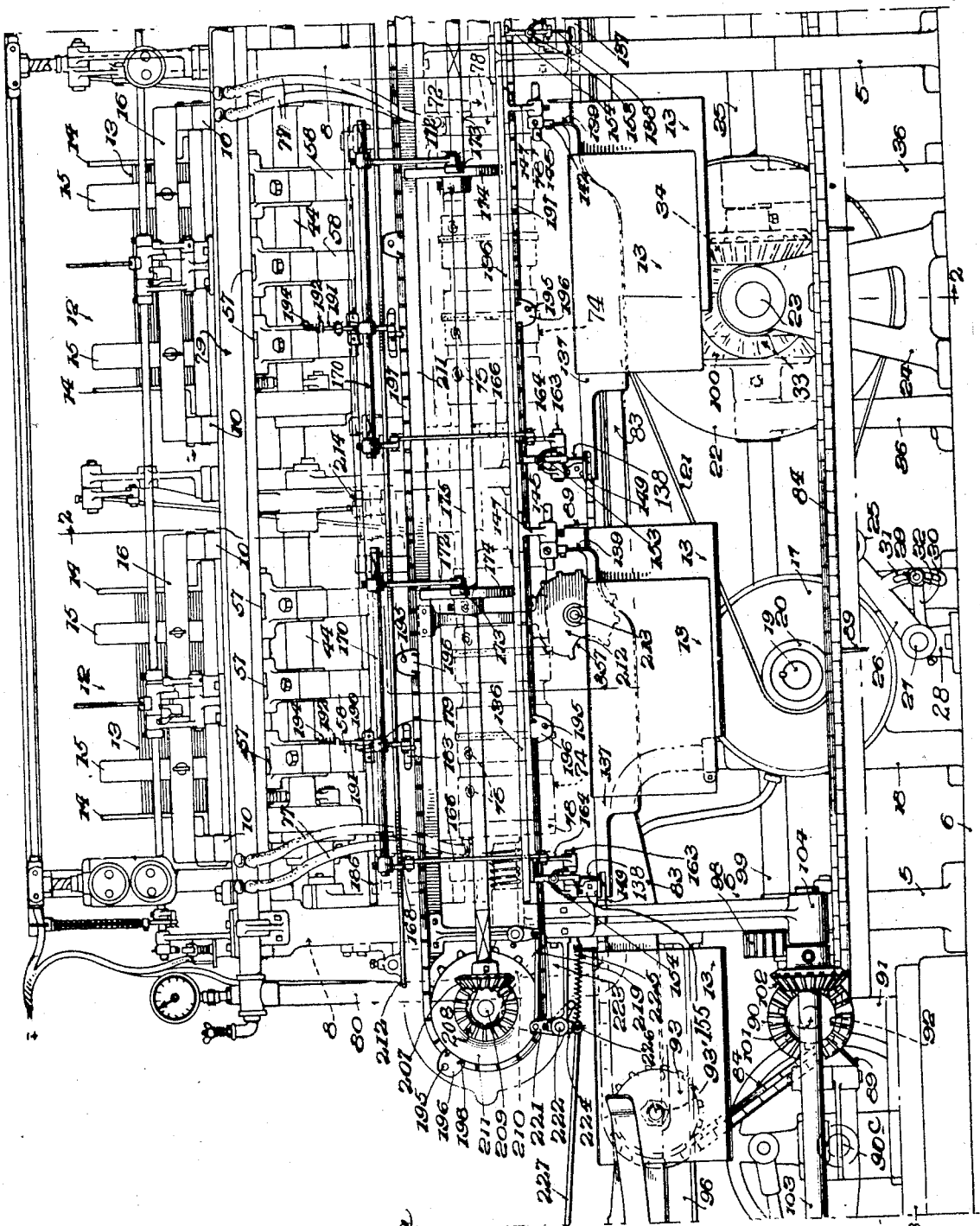

Nov. 10, 1931.  E. R. KAST  1,831,497

SIGNATURE ASSEMBLING AND STITCHING MACHINE

Filed Aug. 5, 1929    7 Sheets-Sheet 3

Inventor
Edward R. Kast
By Cameron, Kerkam & Sutton
attorneys

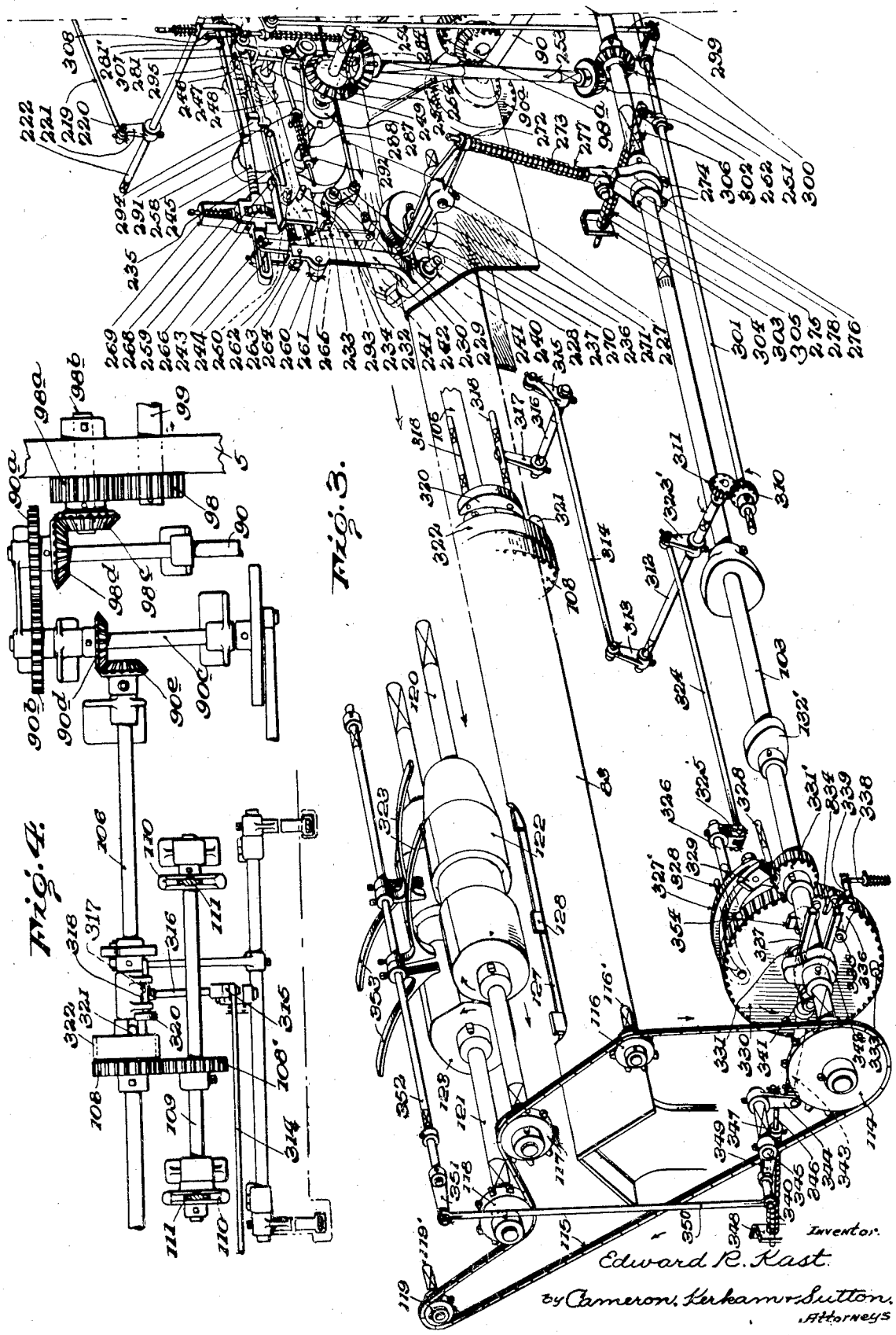

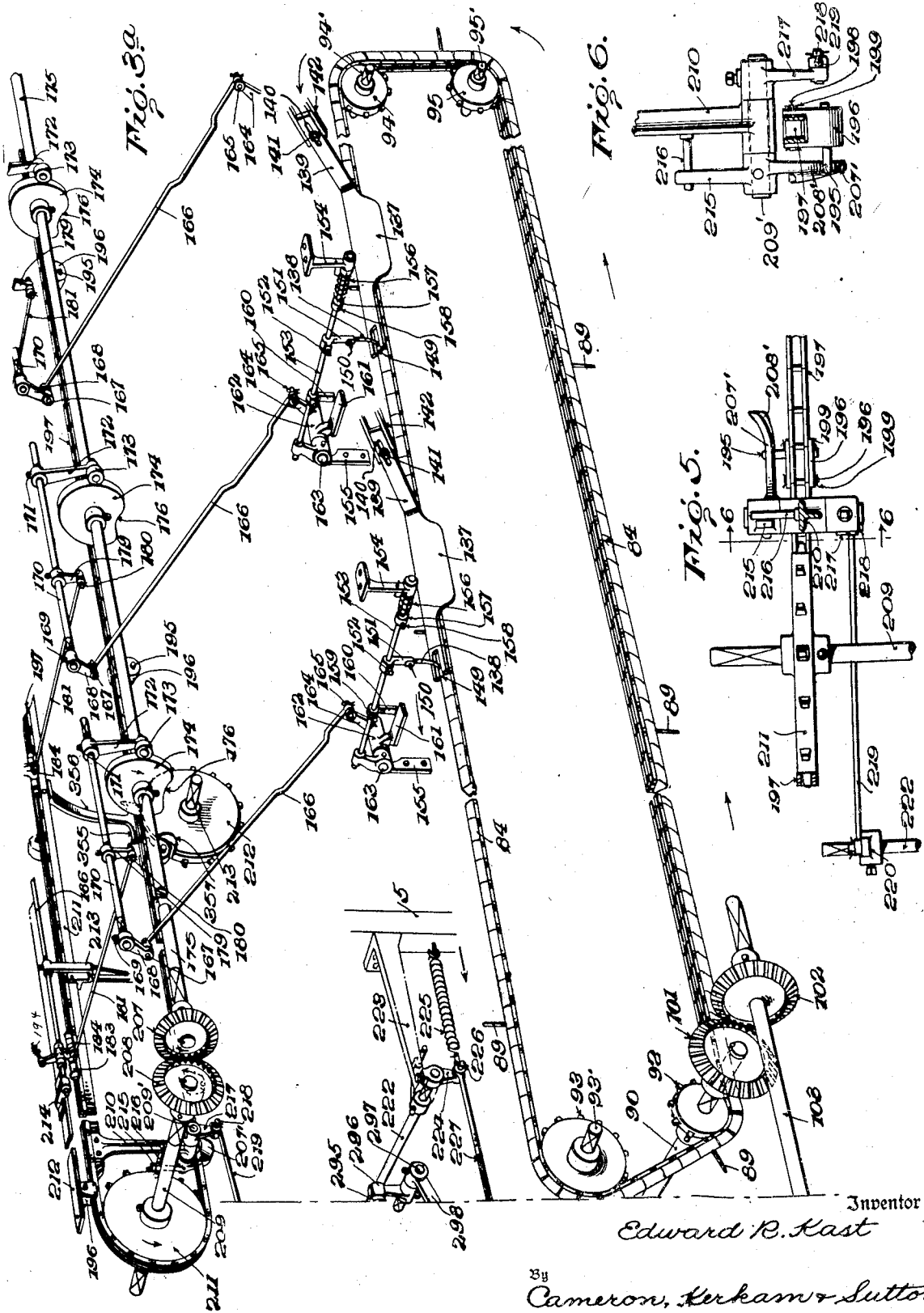

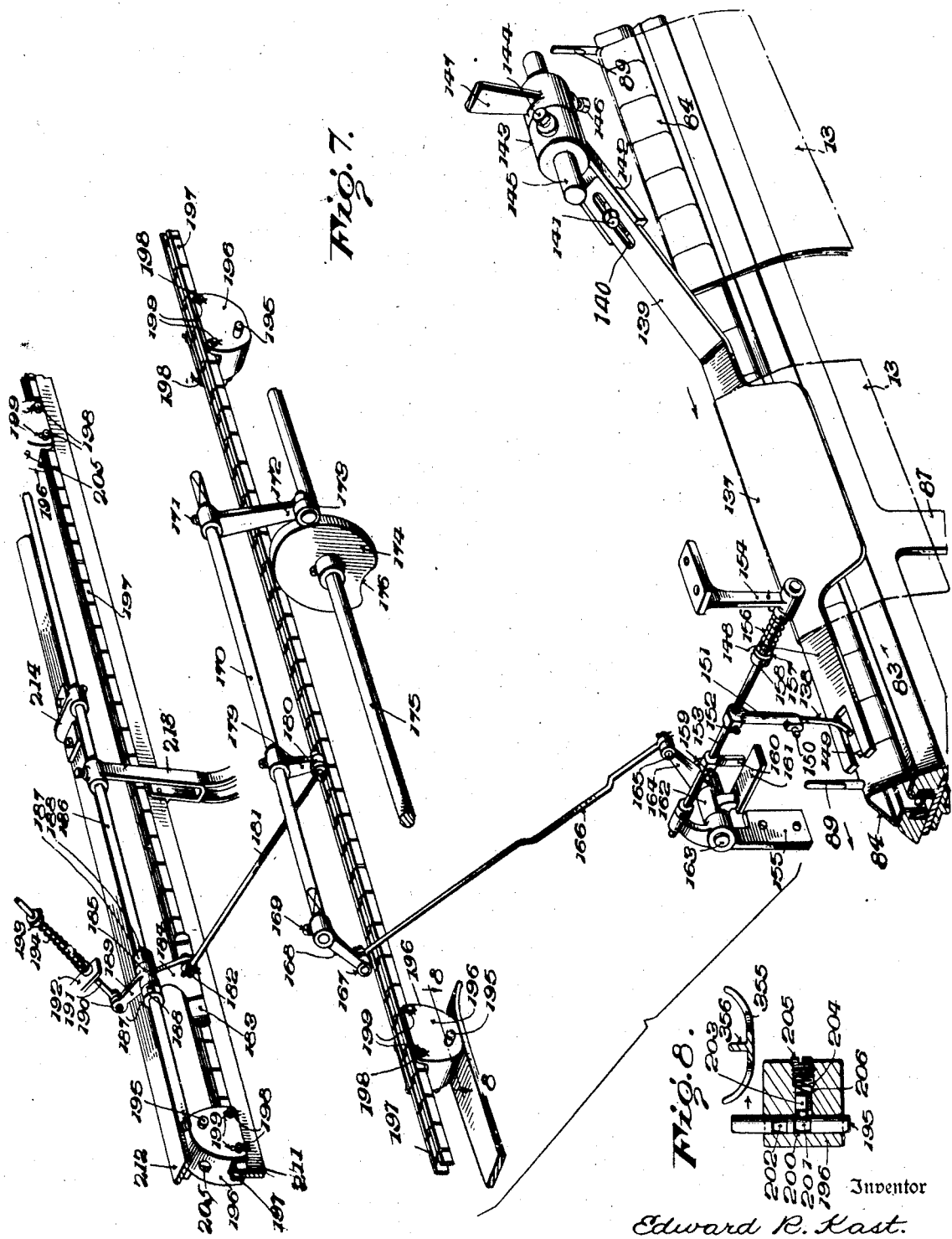

Nov. 10, 1931.    E. R. KAST    1,831,497
SIGNATURE ASSEMBLING AND STITCHING MACHINE
Filed Aug. 5, 1929    7 Sheets-Sheet 7
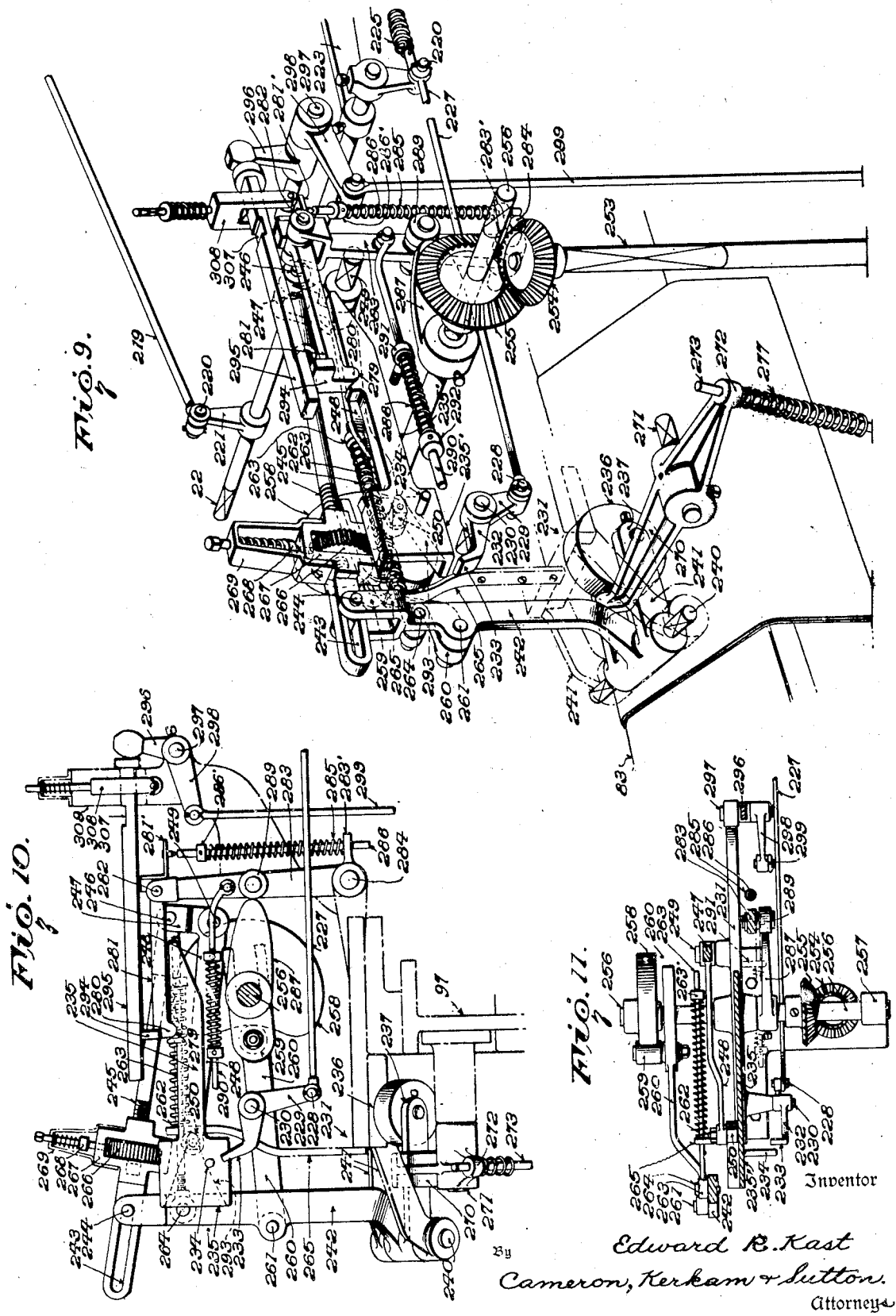
Inventor
Edward R. Kast
By Cameron, Kerkam & Sutton.
Attorneys Patented Nov. 10, 1931

1,831,497

UNITED STATES PATENT OFFICE

EDWARD R. KAST, OF PEARL RIVER, NEW YORK, ASSIGNOR TO DEXTER FOLDER COMPANY, OF NEW YORK, N. Y., A CORPORATION OF NEW YORK

SIGNATURE ASSEMBLING AND STITCHING MACHINE

Application filed August 5, 1929. Serial No. 383,579.

This invention relates to signature assembling and stitching machines, and more particularly to mechanism for controlling the operation of various parts of the machine.

It has heretofore been proposed to control the stitching and delivery of books or signatures by calipering mechanism interposed between the signature assembling devices and the stitchers and acting in the event of contact with defective books or signatures to throw the stitchers out of operation and switch the defective books or signatures out of the machine separately from the perfect books or signatures. A calipering mechanism operating in this manner, is disclosed in my Patent No. 1,644,192 granted October 4, 1927, for a machine for assembling and stitching signatures. Such a caliper is very effective when the thickness of the assembled book does not vary more than the thickness of a single sheet. However such variation frequently occurs and so additional means are required to insure perfect books.

One object of the present invention is to provide, in addition to the calipering mechanism (which may, if desired, be omitted), auxiliary detector mechanism controlled by the signatures at the assembling means and acting to control the devices forwardly thereof such as the stitchers and delivery switches.

Another object of the invention is to provide auxiliary detector mechanism which enables the calipering device to perform its usual function of calipering as to thickness whereas the auxiliary detector disregards thickness and concerns itself only with the presence of a signature.

Another object of the invention is to provide detector mechanism supplementary to the calipering device and which, in the event the latter fails to operate, will nevertheless maintain under control the stitchers, switches or other devices.

Another object of the invention is to provide detector mechanism which controls the stitchers, switches, or other devices through the same mechanism that is actuated by the caliper to control said instrumentalities.

Another object of the invention is to provide detector devices which, through the arrangement thereof at intervals along the saddle and conveyor of the signature assembling mechanism control the operation of various instrumentalities of the machine in accordance with the delivery or non-delivery of signatures from each hopper to said saddle and conveyor.

Another object of the invention is to provide an improved control mechanism which is simply constructed, highly efficient, and inexpensive to manufacture, install, and maintain in operation.

These and other objects of the invention will appear as the following description thereof proceeds, and in order to more clearly understand said invention reference may be had to the accompanying drawings, which illustrate one embodiment of the inventive idea.

In said drawings:—

Figs. 1 and 1a are substantially complementary side elevations of a signature assembling and stitching machine equipped with mechanism embodying the present invention, certain parts being broken away and indicated in dot and dash lines to more clearly show other parts arranged rearwardly thereof;

Fig. 2 is a transverse vertical sectional view on the line 2—2 of Fig. 1a;

Figs. 3 and 3a are enlarged, substantially complementary perspective views showing the detector devices, the caliper, and the connections for said devices and said caliper with the instrumentalities controlled thereby;

Fig. 4 is a top plan view of part of the driving mechanism;

Fig. 5 is an enlarged, fragmentary top-plan view of part of the detector mechanism shown in Fig. 3a;

Fig. 6 is an end view, partly in section, of a pin operated lever and associated devices shown in Figs. 3a and 5;

Fig. 7 is an enlarged detail perspective view of part of the mechanism shown in Fig. 3a;

Fig. 8 is an enlarged, transverse horizontal sectional view through a pin block and pin operating cam shown in Figs. 3a and 7;

Fig. 9 is an enlarged detail perspective view of the caliper and control devices associated therewith, shown in Figs. 1 and 3;

Fig. 10 is an enlarged side elevation of the caliper and the control devices associated therewith; and Fig. 11 is a fragmentary top plan view, partly in section, of the caliper and devices shown in Fig. 10.

Referring to the drawings, wherein like reference characters designate like parts throughout the several views, the signature assembling and stitching machine therein shown is supported on suitable framework including frames 5 which extend transversely of the machine in spaced relation and are bolted or otherwise suitably secured to a machine foundation 6. The frames 5 are connected together at their upper ends by longitudinally extending supports 7 and transversely extending frames 8. The last named frames and said supports are bolted or otherwise suitably secured to the frames 5, the frames 8 being connected together by longitudinally extending supports 9 which have bolted or otherwise suitably secured thereto cross members such as indicated at 10. These cross members are arranged in spaced relation along the supports 9 and carry rollers 11 which form the bottoms of signature hoppers that are indicated generally at 12. These hoppers are open at the back thereof to provide for introduction of stacks of signatures 13 into said hoppers. The sides of the hoppers are provided by plates 14 that are bolted or otherwise suitably secured to the cross members 10. The fronts of the hoppers are provided by plates 15 that are bolted or otherwise suitably secured on members 16 which extend longitudinally of the machine and are supported by cross members 10.

The drive for the various movable parts of the machine is derived from an electric motor 17, and may be manually controlled in the usual or any suitable manner. This motor 17 is mounted on a suitable support 18 that is bolted or otherwise suitably secured to the foundation 6. Fixed on the armature shaft 19 of the motor 17, is a pulley 20 around which passes a belt 21. The belt 21 also passes around a pulley 22 which is fixed on a shaft 23 that extends transversely of the machine and is journaled in suitable bearings on brackets one of which is indicated at 24. These brackets are bolted or otherwise suitably secured to the foundation 6. Tension on the belt 21 may be regulated as desired, by a roller 25 which engages said belt and is journaled on an arm 26. The arm 26 is fixed on a shaft 27 journaled in a bracket 28 bolted or otherwise suitably secured to the foundation 6. Adjustment of the roller 25 is effected by a set screw 29 mounted on an arm of the bracket 28. This set screw engages an arm 31 on the arm 26, the arm 31 being provided with a slot 32 to receive the set screw 29 and provide for adjustment of the parts as aforesaid.

Fixed on the shaft 23 is a bevel gear 33 that meshes with a similar gear 34 which is fixed on a shaft 35. This shaft 35 extends longitudinally of the machine and is journaled in suitable bearings on brackets 36 which are bolted or otherwise suitably secured to the foundation 6. Fixed on the shaft 35 is a spur gear 37 which meshes with a spur gear 38 that is fixed on a shaft 39. The shaft 39 also extends longitudinally of the machine and is journaled in suitable bearings on the frames 8. Fixed on the shaft 39 is a spur gear 40 that meshes with a spur gear 41 which is fixed on a shaft 42 extending longitudinally of the machine and journaled in suitable bearings on the frames 8 thereof. This spur gear 41 meshes with a similar gear 43 that is fixed on a shaft 44 journaled in suitable bearings on hangers such as indicated at 45. These hangers are bolted or otherwise suitably secured to the longitudinally extending supports 9 and depend therefrom into the machine as clearly shown in Fig. 2. Arranged below the forward ends of the signature hoppers 12 are suction separators such as indicated at 46. These separators are each adapted to move upwardly into engagement with the bottom signature of the stack in the adjacent hopper, then move downwardly to separate the forward edge of said signature from those above it. Suction is automatically created and broken in these separators by suitable means (not shown), to separate the forward edges of the signatures from those above them as aforesaid.

After the forward edges of the bottom signatures in the several hoppers have been separated as just described, the suction in the separators is broken and the forward edges of the separated signatures are seized by grippers which act to complete the separation of the signatures from the boxes and deliver them to opening and assembling means hereinafter referred to.

Each separator 46 is cam operated from the shaft 44 by suitable means for this purpose including a link 47. This link is pivotally connected at 48 with an arm 49 that is fixed on a rock shaft 50 journaled in suitable bearings on the hangers 45. The operating mechanism for each separator 46 further includes an arm 51 that is fixed on the rock shaft 50 and pivotally connected at 52 with one extremity of a link 53. The opposite extremity of the link 53 is pivotally connected at 54 with a bell crank that is journaled in any suitable manner on the adjacent cross member 10 and provided with an arm 55 that carries the separator 46.

A set of the grippers above referred to is provided for each hopper 12, each of the sets of grippers being indicated at 56, 57. Each set of grippers is mounted on a gripper support 58 that is fixed on the shaft 44 to rotate therewith. These grippers are preferably constructed and operated as disclosed in my copending application Serial No. 383,577 filed August 5, 1929, and it is therefore unnecessary to describe the same in detail. It is sufficient to note that after each separator 46 has turned down the forward edge of the bottom signature in the corresponding hopper 12, a set of the grippers 56, 57 seizes said signature, separates the same from the stack of signatures in said hopper, and delivers the separated signature to a table 59. It will be understood, of course, that a separator 46, set of grippers 56, 57, and a table 59 will be provided for each hopper 12, and that the signatures in the hoppers will be successively separated and delivered onto the tables 59 during the operation of the machine. The tables 59 include frames 60 the rear ends of which are supported on a stay shaft 61 carried by the hangers 45. The front ends of the frames 60 are provided with legs 62 that are mounted on a stay shaft 63 carried by the frames 8 at the front thereof. The stay shafts 61, 63 extend longitudinally of the machine one above the other, and the tables 59 are inclined downwardly toward the front of the machine and provided with rollers 64. These rollers assist in feeding the signatures downwardly toward signature opening and feeding means to be hereinafter described, and said rollers are all driven in a clockwise direction (Fig. 2) by suitable means for this purpose including gears 65 which are fixed on shafts 66 and mesh with gears (not shown) which are fixed on shafts 67 that carry the rollers 64. The shafts 66, 67 are journaled in suitable bearings on the frames 60.

The signatures are placed in the hoppers 12 with their backs against the front members 15 of said hoppers. It will thus appear that when the signatures are separated and deposited on the tables 59, the free edges of the signatures that are parallel with the folded backs thereof, will be disposed forwardly of the signatures for delivery into the opening and delivering means above referred to.

This opening and delivering means is preferably operated and constructed as follows. The gear 41 meshes with a gear 68, which is fixed on a shaft 69 extending longitudinally of the machine and journaled in suitable bearings on brackets 70. These brackets project forwardly from the machine and are bolted or otherwise suitably secured to the frames 8 and one of the supports 7. The gear 68, in turn, meshes with a gear 71 which is fixed on a shaft 72 extending longitudinally of the machine in parallel relation with the shaft 69 and also journaled in suitable bearings on the brackets 70. The shafts 69, 72 have fixed thereon at intervals along the same, a plurality of sets of rollers 73, 74, respectively, each set of rollers being arranged to receive the signatures successively from one of the hoppers 12 and its corresponding table 59. The rollers 73, 74 are provided at corresponding points thereon with apertured suckers 75 that communicate with chambers in the interior portions of said rollers. These chambers are provided at corresponding ends thereof with arcuate-shaped ports (not shown) which are intermittently rotated into and out of registry with the lower ends 76 of such conduits 77. Said lower ends 76 of the conduits 77 project through suitable openings formed in disks 78 having airtight fits with ends of the rollers 73, 74. The upper ends of the conduits 77 are connected with a suction pipe 79 that extends longitudinally of the machine and is bolted or otherwise suitably secured at the top and front thereof on one of the supports 9. This suction pipe 79, in turn, is connected with one extremity of a suction pipe 80, the opposite extremity of the pipe 80 being connected with a suitable vacuum pump (not shown) which, if desired, may be driven by the motor 17.

Each table 59 has secured to the lower forward edge thereof a plate 81 in front of which is arranged a curved guide 82 for directing the signatures into the bite of the adjacent set of rollers 73, 74. The guide 82 for each set of rollers is bolted or otherwise suitably secured to the adjacent set of brackets 70 that support said rollers and the driving shafts 69, 72 therefor. As each signature is directed into a set of the rollers 73, 74 by the corresponding guide 82, the suckers 75 grip the signature through the action of the vacuum created in the rollers by the described means for this purpose. The rotating rollers open the halves of the signatures. When the signatures are thus opened the vacuum in the rollers 73, 74 is broken and the signatures drop from the rollers onto a saddle 83 the upper part of which is formed for a portion of its length by a driven conveyor 84 for assembling groups of signatures delivered onto said saddle from the several boxes or hoppers 12, respectively. The saddle 83, which is disposed under the sets of rollers 73, 74, extends forwardly of said rollers past a stitching mechanism indicated broadly at 85 and a delivery mechanism, indicated broadly at 86 (Fig. 1). Said saddle is supported on standards 87 arranged in spaced relation longitudinally of the machine and bolted or otherwise suitably secured to the foundation 6 and a foundation 88. The conveyor 84 is provided at intervals therealong with signature pushing fingers 89, and said conveyor is driven by any suitable means for this purpose including a driven shaft 90 which extends transversely of the machine and is journaled in suitable bearings formed in brackets one of which is indicated at 91. These brackets are bolted or otherwise suitably secured to the foundation 88, and the shaft 90 has fixed thereon a sprocket 92 around which passes the chain or conveyor 84.

This chain or conveyor also passes around idler sprockets 93, 94 and 95. The sprocket 93 is fixed on a stub shaft 93' that is journaled in a suitable bearing on a support 96 one end of which is bolted or otherwise suitably secured to the adjacent frame 5. The opposite end of the support 96 is bolted or otherwise suitably secured to a standard 97 which supports the calipering mechanism to be hereinafter described. This standard 97 is bolted or otherwise suitably secured to the foundation 88. The sprockets 94, 95 are fixed on stub shafts 94', 95' (Fig. 3a) which are journaled one above the other in suitable bearings on one of the frames 5 (not shown). The shaft 90 is driven through the medium of intermediate gearing, by a gear 98 that is fixed on a shaft 99. This shaft 99 extends longitudinally of the machine and is journaled in suitable bearings on one of the frames 5 and one of the brackets 36 that carry the shaft 35. The shaft 99 is driven by the bevel gear 33, and for this purpose said gear meshes with a bevel gear 100. This bevel gear 100 is fixed on the shaft 99 at the end thereof opposite that carrying the gear 98. The gear 98 meshes with a gear 98$^a$ which is fixed on a stub shaft 98$^b$ (Fig. 4). This stub shaft is journaled in a suitable bearing on the forward frame 5. Fixed on the stub shaft 98$^b$ is a bevel gear 98$^c$ that meshes with a similar gear 98$^d$. The gear 98$^d$ is fixed on the shaft 90 which is thus driven from the shaft 99.

Fixed on the shaft 90 is a bevel gear 101 which meshes with a similar gear 102 that is fixed on a shaft 103. This shaft 103 extends longitudinally of the machine from the assembling conveyor 84 to the delivery mechanism 86, one end of said shaft being journaled in a suitable bearing 104 carried by the adjacent frame 5. Other bearings are provided for said shaft at intervals along the same, such bearings preferably being formed on brackets 105 (Fig. 1) that are bolted or otherwise suitably secured to the foundation 88. The stitching mechanism 85 is driven by a separate shaft 106 which, in turn, is driven from the shaft 90. For this purpose, the shaft 90 has fixed thereon a gear 90$^a$ (Fig. 4) which meshes with a gear 90$^b$ that is fixed on a shaft 90$^c$ extending transversely of the machine and journaled in suitable bearings on the foundation 88. The shaft 90$^c$ has fixed thereon a bevel gear 90$^d$ which meshes with a similar gear 90$^e$ that is fixed on the shaft 106.

The stitching mechanism may be of any well known type embodying a pair of stitcher heads 107 which are supported in any suitable manner over the saddle 83 so as to stitch or staple the groups of signatures that are successively advanced along the saddle 83 from the conveyor 84, by signature advancing mechanism (not shown). Said advancing mechanism may be of any suitable construction such, for example, as disclosed in my Patent No. 1,644,192, above referred to. The signature advancing mechanism forms no part of the present invention and it is therefore unnecessary to describe or illustrate the same. It is pointed out, however, that the signature advancing mechanism employed acts to advance the groups of signatures along the saddle 83, past the stitcher heads 107, and into the delivery mechanism 86. The stitching mechanism 85 may be operated by suitable devices such as shown, for example, in Patent No. 1,644,192. These devices include a gear 108 which is loosely mounted on the shaft 106 and meshes with a second gear 108' which is fixed on a shaft 109 journaled in suitable bearings on the foundation 88. This shaft 109 has fixed on the opposite ends thereof eccentrics 110 engaging the lower, strap ends of members 111 that actuate the rock arms and driving rail (not shown) for operating the stitcher heads.

The delivery mechanism 86 may be of any suitable construction such, for example, as disclosed in my copending application Serial No. 383,576, filed August 5, 1929. The delivery mechanism is mounted on a pair of side frames 112 which extend transversely of the machine in spaced relation and are bolted or otherwise suitably secured to the foundation 88. These side frames have bolted or otherwise suitably secured on the tops thereof a pair of auxiliary frames 113 which carry certain of the movable parts of the delivery mechanism. The delivery rollers, hereinafter referred to, are driven from the shaft 103 which, for this purpose, has fixed thereon a sprocket 114. Passing around this sprocket is a chain 115 that also passes around sprockets 116, 117, 118 and 119. The sprockets 116, and 119 are idlers fixed on stub shafts 116', 119', respectively, said stub shafts being journaled in suitable bearings on one of the frames 112. The sprockets 117, 118 are fixed on shafts 120, 121, respectively, which are journaled in suitable bearings on the tops of the frames 112. The shafts 120, 121 have fixed thereon delivery rollers 122, 123, respectively, and said shafts and the rollers carried thereby are adjustable toward and away from each other through the medium of suitable devices for this purpose. The chain 115 passes over the sprocket 117 and under the sprocket 118 so that the rollers 122, 123 are oppositely driven in the direction of the arrows (Fig. 3). In addition to the adjustment of the delivery rollers above referred to, one of said rollers may be moved manually away from the other, if desired. For this purpose, the delivery mechanism is provided with a pair of manually operated handles 124 which are fixed on a rockshaft 125 that is journaled in suitable bearings on the auxiliary frames 113. The auxiliary handles 124 are provided with arms 126 which are pivotally connected with links (not shown) having their corresponding ends loosely mounted on the shaft 120 so that when the handles 124 are moved in the proper direction, the roller 122 will be moved away from the roller 123. In order to provide for such movement of the roller 122, and also for relative adjustment of said roller and the roller 123, the shafts 120, 121 are mounted in slidable bearings such as disclosed in my copending application Serial No. 383,576, above referred to, and having associated therewith the adjusting devices disclosed in said application.

The saddle 83 extends into the delivery mechanism 86 under the rollers 122, 123, and is there provided with an opening 127 (Fig. 3) for a knife 128. This knife moves up and down through the opening 127 and as each group of signatures is advanced under the rollers 122, 123, said knife moves upwardly into the group of signatures, engages the same at the fold line thereof, and introduces said group of signatures into the rollers 122, 123 between the same. Said rollers thereafter deliver the signature from the machine onto a suitable signature packer or other receiving device (not shown).

The knife 128 is fixed on a holder 129 provided with slides 130 that are arranged to reciprocate in guides 131 formed on brackets 132 which are bolted or otherwise suitably secured to the foundation 88. The knife 128 is operated from a cam 132' on the shaft 103, by suitable means for this purpose including a link 133 that is pivotally connected at 134 with a lug 135 formed on the holder 129. The operation and construction of this knife, as well as that of the delivery rollers 122, 123, is substantially the same as disclosed in my copending application Serial No. 383,-576, and it is therefore unnecessary to further describe these devices.

The foregoing describes generally the construction and operation of one type of machine which may be equipped with mechanism embodying the present invention. Proceeding now to a description of said mechanism, the same is preferably operated and constructed as follows. Extending longitudinally of the machine and bolted or otherwise suitably secured to the brackets 70 projecting therefrom, is a bar 136. Mounted on said bar at intervals along the same are a plurality of auxiliary saddles 137 and a plurality of detectors 138, each auxiliary saddle and detector being mounted under one of the sets of rollers 73, 74. The saddles 137 extend over one side only of the saddle 83 and the conveyor 84, so as not to interfere with the movement of the pusher fingers 89 which are secured to the conveyor 84 and act to push the signatures along the saddles 137 and the saddle 83. The saddles 137 are inclined in substantially parallel relation with the outer inclined surfaces of the saddle 83 and the conveyor 84, the saddles 137 having secured to or formed integrally therewith at corresponding ends, L-shaped arms 139 that are inclined upwardly and outwardly from the saddles 137 and provided on the ends remote therefrom, with slots 140. Passing through the slots 140 are set screws 141 by means of which the saddles are secured to downwardly and inwardly inclined arms 142. Through the medium of the slots 140 and the set screws 141, the saddles 137 may be adjusted toward or away from the saddle 83 and the conveyor 84, as desired.

The arms 142 are provided on their upper ends with sleeves 143 through which pass set screws 144 by means of which the arms 142 and the saddles 137 are adjustably secured on rods 145. The rods 145, in turn, are adjustably secured as by set screws 146, on brackets 147 which are bolted or otherwise suitably secured to the bar 136 and depend therefrom as clearly shown in Fig. 1a. The saddles 137 are provided at the ends thereof opposite those secured to the arms 139, with reduced extensions 148 in the ends of which are formed slots 149. The detectors 138 normally project into the slots 149 of the saddles 137, these detectors being adjustably secured at 150 in holders 151 which depend from and are secured at 152 to rockshafts 153 extending transversely of the machine over the saddle 83 and between the sets of rollers 73, 74.

The rockshafts 153 are journaled in suitable bearings on brackets 154, 155 which are bolted or otherwise suitably secured in spaced, alined relation on the bar 136 and one of the supports 7, respectively, (Figs. 1a and 2). The brackets 154 depend from the bar 136, and have secured to their depending arms the outer ends of coil springs 156 which are mounted on the rockshafts 153. The inner ends of said springs are secured to collars 157 which, in turn, are adjustably secured on the rockshafts 153, as by set screws 158. By adjusting the collars 157, the tension of the springs 156 may be regulated as desired. The springs 156 normally tend to turn the shafts 153 so that the detectors 138 project into the slots 149 of the auxiliary saddles 137.

Fixed on the rockshafts 153, as by set screws 159, are detents 160 that are normally positioned rearwardly of the arms 161 of bell cranks 162. These bell cranks are rotatably mounted on shafts 163 carried by the brackets 155, and the other arms 164 of said bell cranks are pivotally connected at 165 with the corresponding or lower extremities of links 166. The opposite or upper extremities of said links are pivotally connected at 167 with arms 168 that are secured at 169 on rockshafts 170. The rockshafts 170 are journaled in suitable bearings on the hangers 45 (Fig. 2), and said rockshafts have fixed thereon at 171, arms 172 on the free ends of which are journaled rollers 173. The rollers 173 engage cams 174 which are fixed on a cam shaft 175 and provided with recesses or depressions 176. The cam shaft 175 is journaled in suitable bearings on brackets 177 (Fig. 2) that are bolted or otherwise suitably secured to the frames 8. The cam shaft 175 is driven by a gear 178 which is fixed on said cam shaft and meshes with the driven gear 41.

The rockshafts 170 also have fixed thereon arms 179, the free ends of which are pivotally connected at 180 with the corresponding or lower extremities of links 181. The opposite or upper extremities of the links 181 are pivotally connected at 182 with movable cams 183 formed on the arms 184 of bell cranks 185. The bell cranks 185 are rotatably mounted on a stay shaft 186 and retained against endwise displacement thereon by collars 187 that are secured to the stay shaft at opposite sides of the bell cranks, as by set screws 188. The other arms 189 of the bell crank 185 are pivotally connected at 190 with the lower ends of rods 191 which project loosely through suitable openings formed in brackets 192 that are bolted or otherwise suitably secured to the framework of the machine at the top thereof. Mounted on the rods 191 between the brackets 192 and collars 193 fixed on the upper ends of said rods, are springs 194 that maintain the rollers 173 in engagement with the cams 174 and normally tend to force said rollers into the recesses 176 of said cams to thus swing the cams 183 into the path of travel of pins 195. These pins are horizontally and slidably mounted in blocks 196, the blocks 196 and the cams 183 corresponding in number to the number of signature hoppers 12 and sets of rollers 73, 74, repsectively. The blocks 196 are secured at intervals to a driven endless chain 197, as by bolts 198 that pass through suitable alined openings in the blocks and chain and which have suitable openings for cotter pins 199 that prevent displacement of said bolts and said blocks from said chain. Each block 196, as clearly shown in Fig. 8, has an opening 200 extending therethrough in which the pin 195 of said block is slidably mounted. Each pin 195 is provided intermediate its opposite ends, with notches 201, 202 adapted to be alternately engaged by a detent 203, which is pressed into one or the other of said notches by a spring 204. One end of the spring 204 bears against detent 203 and the opposite end of said spring bears against an adjusting screw 205. Said screw has threaded engagement with the walls of a suitable opening formed in the block 196 at right angles to the opening 200 and providing a housing for the detent 203 and the spring 204.

The chain 197 is driven from the cam shaft 175 which, for this purpose, has fixed thereon a bevel gear 207. This bevel gear meshes with a similar gear 208 that is fixed on a shaft 209 journaled in a suitable bearing on a bracket 210 (Fig. 1a) that is bolted or otherwise suitably secured to the forward frame 5 of the machine. The shaft 209 also has fixed thereon a sprocket 211 around which passes the chain 197. The chain 197 passes around a second sprocket (not shown) which is mounted in any suitable manner on the machine framework at the end thereof opposite that carrying the shaft 209 and the sprocket 211. The chain 197 also passes around an idler sprocket 212 (Fig. 2) which is fixed on a stub shaft 213 that is journaled in a suitable bearing formed in a bracket 214. This bracket 214 is bolted or otherwise suitably secured to one of the frames 5 of the machine.

The pins 195 normally project from the side of the blocks 196 which travel past the cams 183, and in the normal operation of the machine, signatures are delivered onto the auxiliary saddles 137 by the rollers 73, 74, and advanced therefrom by the pusher fingers 89 along the saddle 83. The detectors 138 will thus be engaged by the signatures to swing the detents 160 over the bell crank arms 161 and prevent the springs 194 from forcing the rollers 173 in the cam depresssions 176. The cams 183 will thus be prevented from moving toward the chain 197 and into the path of travel of the pins 195 which normally project from the blocks 196 as previously described.

In the event a signature is absent or not delivered onto an auxiliary saddle 137, the corresponding detector 138 will not be positioned over the bell crank arm 161 and the roller 173 connected therewith will be forced into the recess 176 of the adjacent cam 174 by the corresponding spring 194. The cam 183 connected with the parts just mentioned will then be moved toward the chain 197 so that when the block 196 corresponding with the sets of rollers 73, 74 which failed to deliver a signature onto the adjacent saddle 137 reaches the aforesaid cam 183, the pin 195 of said block will engage the cam and thereby be forced outwardly from the opposite side of the block. When the pin is forced outwardly to the opposite side of the block as just described, it overcomes the action of the spring 204 to hold the detent 203 in the notch 201 of said pin. The detent 203, however, is immediately engaged under the conditions stated, with the recess 202 in the pin 195, to prevent it from being displaced beyond the required distance.

When a pin 195 is thus pushed to the opposite side of the block 196 by one of the cams 183, this block and pin travel around with the chain to a point where the pin engages a crescent-shaped arm 207' and swings said arm in a counterclockwise direction (Fig. 3a). The arm 207' when thus moved, operates mechanism hereinafter described, which acts to prevent the stitchers 107 from operating on the book having the missing signature and to throw out the defective book or signature at the delivery mechanism. The arm 207' is provided on the free end thereof with a cam surface 208' (Fig. 5) which allows the pin 195 to be disengaged easily from said arm after it has lifted or swung the latter as before described. This arm 207' is fixed on a rockshaft 209' that is journaled in a suitable bearing on a bracket 210 which is bolted or otherwise suitably secured to a rail 211 and depends therefrom. This rail 211 extends longitudinally of the machine and supports the upper reach of the chain 197. The blocks 196 on the upper reach of the chain are engaged by a guide 212 which, together with the rail 211 are supported by brackets 213 (Fig. 2) that are bolted or otherwise suitably secured to one of the supports 7. These brackets 213 carry the stay shaft 186 on which the bell cranks 185 are journaled, said stay shaft carrying brackets 214 (Fig. 2) to which the guide 212 is directly connected. The rail 211, however, is directly connected to the brackets 213 and extends in parallel relation with the guide 212 between which and the rail 211 the upper reach of the chain 197 runs as before described.

The rockshaft 209' has fixed thereon a stop 215 which is normally engaged with a pin 216 secured to the bracket 210 and projecting from one side thereof. This stop prevents accidental movement of the arm 207' in a clockwise direction beyond the normal control position of said arm shown in Fig. 3a. Fixed on the rockshaft 209' at the end thereof opposite that carrying the stop 215, is an arm 217 which is pivotally connected at 218 with one extremity of a link 219. The opposite extremity of the link 119 is pivotally connected at 220 (Fig. 3) with an arm 221 that is fixed on a rockshaft 222. This rockshaft is journaled in suitable bearings on brackets one of which is indicated at 223 (Figs. 1a and 3a). These brackets are bolted or otherwise suitably secured to the front frame 5 of the machine and project forwardly and horizontally therefrom as clearly shown in the figures just referred to. Fixed on the rockshaft 222 at the end thereof opposite that carrying the arm 221, is an arm 224 having connected therewith one extremity of a spring 225. The opposite extremity of said spring is connected to the front frame 5 of the machine. The arm 224 is pivotally connected at 226 with one extremity of a link 227 the opposite extremity of which is pivotally connected at 228 with one arm 229 of a bell crank that is pivoted at 230 on a bracket 231 (Fig. 1) which carries the calipering mechanism to be presently described. This bracket 231 is bolted or otherwise suitably secured on the standard 97 at the upper end thereof. The other arm 232 of the bell crank just referred to is provided on the free end thereof with a hook or detent 233 (Figs. 1, 3a and 9 to 11, inclusive).

When the arm 207' is moved in a counterclockwise direction (Fig. 3a) by one of the pins 195 on the chain 197, said arm, through the described connections therefor with the bell crank 229, 232, moves the detent 233 upwardly into the path of travel of a stop pin 234 (Fig. 10) formed on the forward end or head 235' of a normally reciprocating bar 235. The movement of the bar 235 is thus arrested by the detent 233, and when said bar is stopped by said detent, caliper controlled mechanism to be now described, is actuated so that the stitchers 107 are thrown out of operation and a switch forming part of the delivery mechanism 86, is operated to throw out the defective book that was detected by one of the devices 138 at the signature assembling mechanism.

The caliper controlled mechanism, including the bar 235, is preferably operated and constructed as disclosed in my Patent No. 1,644,192, and is interposed between the conveyor 84 and the stitching mechanism 85. The caliper proper (Figs. 1, 3 and 9 to 11, inclusive), is preferably comprised by a roller 236 which is journaled on a pair of arms 237 of a bell crank and disposed in inclined position over one side of the saddle 83. The bell crank just referred to is pivoted at 240 on arms 241 formed on the caliper bracket 231, and the other arm 242 of said bell crank has a slotted pivotal connection 243, 244 with one extremity of a link 245. The opposite extremity of the link 245 is pivotally connected at 246 with a short arm 247 of a bell crank, the other arm of which is indicated at 248. The bell crank 247, 248 is pivotally mounted at 249 on the bracket 231, the bell crank arm 248 having secured to or formed integrally on the forwardly projecting end thereof a lug 250.

The caliper 236 is moved toward and away from the saddle 83 and is set, by suitable means for this purpose, to permit the passage of perfect books only. The caliper is operated toward and away from the saddle 83 by means including a bevel gear 251 (Figs. 1 and 3) which is fixed on the driven shaft 103. This bevel gear 251 meshes with a similar gear 252 which is fixed on the lower end of a shaft 253 journaled in suitable bearings on the standard 97. Fixed on the upper end of the shaft 253 is a bevel gear 254 which meshes with a similar gear 255 that is fixed on a shaft 256 which extends transversely of the machine and is journaled in suitable bearings on bracket 231 and a bracket 257 carried by the standard 97. Fixed on the shaft 256 is a cam 258 which engages a roller 259 that is journaled on a link 260 provided at one end thereof with a fork 260' which is engaged over the shaft 256 (Figs. 10 and 11). The opposite end of the link 260 is pivotally connected at 261 with the arm 242 of the bell crank that carries the caliper 236. The roller 259 is maintained in engagement with the cam 258 by an expansion spring 262 which is mounted on a rod 263 that is pivotally connected at 264 with the bell crank arm 242. The rod 263 extends loosely through a suitable opening formed in a bracket 265 that is bolted or otherwise suitably secured to the bracket 231. The spring 262 is mounted on the rod 263 between the bracket 265 and a collar (not shown) that is fixed on said rod rearwardly of and in spaced relation with said bracket. It will appear from the foregoing, that the caliper 236 is spring-operated in one direction and cam-operated in the opposite direction through the medium of the spring 262 and the cam 258 which engages the roller 259 on the link 260.

Adjustment of the caliper for books varying in thickness is effected by lengthening or shortening the link 245. For this purpose, the link has threaded thereon an adjusting nut 266 that is threaded on the link 245 and housed in a block 267 forming a part thereof. Accidental rotation of the nut 266 is prevented by a spring-pressed detent 268 the lower end of which is normally engaged with said nut. The detent 268 is mounted in a yoke 269 carried by the block 267.

The caliper may further be operated by an arm 270 which is rocked in one direction to engage the bell crank arm 237 and lower the caliper 236, the arm 270 being rocked in the opposite direction to provide for raising movement of the caliper. This arm 270 is fixed on a stub shaft 271 that is journaled in a suitable bearing on the standard 97. The end of the arm 270 opposite that for engaging the bell crank arm 237 is provided with an eye 272 through which loosely projects the upper extremity of a rod 273. The lower extremity of said rod is provided with a fork 274 (Figs. 1 and 3) engaged over the shaft 103 and carrying a roller 275. This roller 275 is engaged by a cam 276 which is fixed on the shaft 103 to rotate therewith. The roller 275 is maintained in engagement with the cam 276 by a spring 277 mounted on the rod 273 between the eye 272 of arm 270 and an abutment 278 on the fork 274.

The bar 235, previously referred to, is arranged for sliding movement in any suitable manner on the bracket 231. This bar is provided in the end thereof opposite that carrying the head 235', with a notch 279 which normally receives the nose 280 of a link 281 that is pivotally connected at 282 with the upper extremity of a lever 283. This lever is pivotally mounted at 284 on the bracket 231, and the nose 279 of the link 281 is normally retained in engagement with the recess 279 in bar 235, by a spring 285. This spring is mounted on a rod 286 the upper end of which is arranged to contact with an extension or bracket 281' on the rear end of the link 281. The rod 286 is mounted on an extension 283' of lever 283 and projects loosely through a suitable opening formed in said extension. The spring 285 is confined on the rod 286 between the extension 283' and a collar 286' or the like secured on the rod. In the normal operation of the machine, the bar 235 and the link 281 are reciprocated by the arm 283 which for this purpose is swung back and forth on its pivot by a cam 287 and a spring 288. The cam 287 is fixed on the shaft 256 and engages a roller 289 which is journaled on the arm 283. The spring 288 is mounted on a rod 290 one end of which is pivotally connected to the arm 283. The opposite end of the rod 290 extends loosely through an eyelet 291 projecting from the bracket 231, the spring 288 being mounted on said rod between said eyelet and a collar 292 which is adjustably mounted on the rod.

The head 235' of the bar 235 is provided in one side thereof with a V-shaped slot 293 having an opening at its rear end which is of sufficient size to provide for movement of the head 235' past the lug 250 on the end of the bell crank arm 248. In the normal operation of the machine, said lug will be positioned by the caliper in alignment with said opening so that the bar 235 and parts connected therewith may be reciprocated by the described means for this purpose. In the event that a signature with more or less sheets than the required number, endeavors to pass the caliper 236, the latter is operated by the described mechanism for this purpose, so that the bell crank arm 248 is raised or lowered, as the case may be, thus throwing the lug 250 out of alignment with the opening in the end of the slot 293 of the head 235'. Movement of the bar 235 is thus arrested and the link 281 is moved upwardly out of engagement with said bar by the action of the rocking lever 283 on said link. The link 281 is provided on the free end thereof with an upwardly extending detent 294 which, when the link is moved upwardly and reciprocated, engages the end of the bar 295 that is slidably mounted in any suitable manner on the bracket 231. The bar 295 is thus moved rearwardly by the link 281 and engages and rocks rearwardly an arm 296 that is fixed on a rockshaft 297. This rockshaft is journaled in a suitable bearing on the bracket 231, and fixed on said rockshaft at approximately 90° to the arm 296, is a second arm 298 that is lifted when the arm 296 is rocked rearwardly by the bar 295. The arm 298 is pivotally connected with one extremity of a vertical link 299 the opposite extremity of which is pivotally connected with an arm 300 that is fixed on the rockshaft 301 (Figs. 1 and 3). This rockshaft is journaled in suitable bearings on the foundation 88 and is provided with a second arm 302 which, through the action of a spring-pressed rod 303, normally tends to position the shaft 301 and the parts connected therewith so that the arm 296 is swung forwardly toward the front end of the machine. One end of the rod 303 is pivotally connected with the arm 302 and the opposite end of said rod passes freely through a suitable opening formed in a bracket 304 that is bolted or otherwise suitably secured to the foundation 88. The rod 303 has mounted thereon a spring 305. This spring is interposed between the bracket 304 and a collar 306 adjustably mounted on the rod 303.

When the bar 295 is moved rearwardly, a notch 307 thereof is engaged by a spring-pressed detent 308 and holds said rod in its rearward position. This detent is mounted in a suitable housing 309 secured to the frame 231. The rod 301 has fixed thereon a bevel gear 310 that meshes with a similar gear 311 which is fixed on one end of a rock shaft 312. The rockshaft 312 extends transversely of the machine and is journaled in suitable bearings on the foundation 88. Fixed on the end of the rockshaft 312 opposite that carrying the bevel gear 311 is an arm 313 which is pivotally connected with one extremity of a link 314. The opposite extremity of the link 314 is pivotally connected with an arm 315 that is fixed on a rockshaft 316 which extends transversely of the machine and is journaled in suitable bearings on the foundation 88 thereof. This rock shaft 316 also has fixed thereon an arm 317 that extends into a slot formed in one of a plurality of rods 318 which extend longitudinally of the machine and are slidably mounted in suitable bearings formed on a bracket 319 bolted or otherwise suitably secured to the foundation 88. The rods 318 have secured on the forward ends thereof a crescent-shaped cam 320 which, when the shaft 301 is rocked by the described connections therefor with the bar 295, is moved by the arm 317 into the path of travel of a spring-pressed pawl 321 that normally forms a driving connection between the shaft 106 and the stitcher mechanism 85. The pawl 321 is carried by a disk (not shown) which is fixed on the shaft 106 and extends within an annular flange 322 formed on the gear 108. In the normal operation of the machine, the pawl 321 engages a notch in the flange 322 and thus provides a driving connection between the shaft 106 and the gear 108. When the shaft 301, however, is rocked by the bar 295 and described devices for this purpose, the shafts 312, 316 are rocked in a counter-clockwise direction (Fig. 3) by the connections for said shaft with the shaft 301. The crescent-shaped cam 320 is thus moved into the path of travel of the spring-pressed pawl 321 so that when the pawl engages said cam, it is moved away from its carrying disk, thus breaking the driving connection between the shaft 106 and the stitcher mechanism 85.

Operation of the shaft 301 in the manner stated is also utilized to throw a switch 323 whereby the defective book or signature is deflected out of the machine and separated from the perfect books or signatures. For this purpose, the shaft 312 has fixed thereon an arm 323' that is pivotally connected with one end of a link 324. The opposite end of the link 324 is pivotally connected with a block 325 that is fixed on a bar 326 which extends longitudinally of the machine and is slidably mounted in a suitable bearing formed on a bracket 327 that is bolted or otherwise suitably secured to the foundation 88 adjacent the delivery mechanism 86. The bar 326 has fixed on one end thereof a cresent-shaped cam holder 327' the opposite ends of which are provided with guide rods 328 slidably mounted in suitable bearings on the bracket 327. The cam holder 327' has fixed thereon a cam 329 which, when the cam holder 327' is moved to the left on counterclockwise rotation of the shaft 312, moves into the path of travel of one of a series of spring-pressed pins that normally project from and to the right of a gear 330 which is fixed on a stub shaft 331 journaled in a suitable bearing on a bracket 332 that is bolted or otherwise suitably secured to the foundation 88. The gear 330 meshes with a gear 331' that is fixed on the shaft 103 which thus acts to drive the gear 330. The spring-pressed pins which are carried by the gear 330, are indicated at 333 and, as before stated, said pins normally project from the right side of said gear. When one of the pins engages cam 329, however, it is pushed to the left on the gear 330 and subsequently engages an arm 334 and rocks the same upwardly. This arm 334 is fixed on a rockshaft 335 that is journaled in a suitable bearing on the foundation 88. Fixed on the rockshaft 335 is a pawl 336 which when the arm 334 is rocked upwardly, is rocked downwardly out of engagement with the end of a fork 337 which extends over the shaft 103. The pawl 336 is normally maintained in engagement with said fork by a spring-pressed rod 338 that is connected with said pawl, as by a pin 339. When the pawl 336 is disengaged from the fork 337, a spring 340 acts to move the fork so that a roller 341 journaled thereon is engaged with a cam 342 that is fixed on the shaft 103. Motion is thus imparted to the fork 337 and a link 343 connected therewith. This link is pivotally connected with an arm 344 that is fixed on a rockshaft 345 which is journaled in a suitable bearing on the foundation 88. The spring 340 is mounted on a rod 346 which is pivotally connected with the arm 344, said spring being interposed between a collar 347 fixed on said rod and a bracket 348 provided with a suitable opening through which the rod loosely extends. The bracket 348 is bolted or otherwise suitably secured to the foundation 88. When the pawl 336 is released from the fork 337 the spring 340, as before stated, moves the roller 341 into engagement with the cam 342 so that the fork is operated by said cam to thus rock the shaft 345. Fixed on the shaft 345 is an arm 349 that is pivotally connected with one end of a vertical link 350. The opposite end of the link 350 is pivotally connected with an arm 351 that is fixed on a shaft 352 journaled in suitable bearings on the frames 113. The shaft 352 has fixed thereon the switch 323 and a switch 353. In the normal position of these switches, the switch 353 is set to deflect the perfect books from the delivery rolls 122, 123 onto a packer or other suitable mechanism for receiving the books from the delivery mechanism. When the fork 337 is operated, however, by the cam 342, such operation is due to the presence of a defective book at the delivery mechanism, and the switch 323, through the described operating connections therefor with the fork 337 is thus thrown into operation so that the defective book or signature is thrown out of the machine and not delivered with the perfect books.

When a pin 333 pushed out of the gear 330 to release the pawl 336, passes said pawl and the arm 334, said pin in its continued travel with the gear 330 is pushed through the gear in the opposite direction and thus reset, by a stationary cam 354 (Fig. 3) which is disposed at the left of said gear and mounted on the foundation 8 in any suitable manner. After release of the pawl 336 from the fork 337 in the manner described, said pawl is reset by the spring-pressed rod 338 so as to arrest the movement of the fork 337 and hold the switches 323, 353 in position whereby the switch 353 may direct the perfect brooks from the delivery mechanism in the usual manner. A resetting means is also provided for the pins 195 on the conveyor chain 197, said resetting means preferably comprising a stationary cam 355 (Fig. 3a) which is secured to or formed integrally with an arm 356. This arm is bolted or otherwise suitably secured to the rail 211 and depends therefrom to position the cam 355 close to the path of travel of the chain 197. When a pin 195 is pushed by a cam 183 into position to operate the lever 207' and the mechanism connected therewith, said pin thereafter engages the cam 355 and is pushed thereby in the opposite direction back to its normal position. In order to insure that pins 195 will be pushed by the cam 355 back to their normal position, the idler gear 212 is provided in the periphery thereof with a recess 357 which receives each block 196 as the same passes said sprocket and the cam 355. The blocks are thus rigidly supported adjacent the cam 355 to insure engagement thereof with the pins 195 when any of them have been pushed by the cams 183 from the normal positions occupied by said pins.

If, after the parts of the caliper mechanism have been moved as described upon the passage of a defective book, the next book should be a good one that has operated one of the detectors 138 so that the detent 233 is disengaged from the pin 234, the nose 280 of the link 281 will, through the action of the spring-pressed rod 286 on the extension 281' on said link, engage the latter with the bar 235 so that the two reciprocate together as before described. When the link 281 is reengaged with the bar 235, the extension 281 of said link raises the detent 308 out of the notch 307 of bar 295, thus permitting the spring 305 to rock the shaft 301 so that the parts operated thereby are returned to their normal position. The detent 308 may, of course, be operated by the devices for this purpose disclosed in my Patent No. 1,644,192.

The operation of the described mechanism will be clearly apparent from the foregoing, and may be briefly summarized as follows. In the absence of a signature on any one of the auxiliary saddles 137, the adjacent detector 138 will fail to operate so that the corresponding detent 160 is not positioned over the adjacent bell crank arm 161. A spring 194 thus forces a roller 173 into the recess 176 of the adjacent cam 174, thereby lifting the corresponding bell crank arm 161 and moving the cam 183 connected therewith so that it forces one of the pins 195 into position to engage the arm 207' when the chain 197 has traveled a predetermined distance. Engagement of said pin with the arm 207' rocks the latter so that the detent 233 engages pin 234 and arrests the movement of the head 235' and the bar 235. The link 281 is thus lifted out of engagement with said bar, and in the continued movement of said link it engages the bar 295 to thereby rock the bell crank arm 298. When the bell crank arm 298 is thus rocked, the described connections for said arm with the cams 320 and 329 move them to the left (Fig. 3) so that they operate in the described manner to stop the operation of the stitchers and move the switch 323 in position to throw out the imperfect book detected at the signature assembling mechanism.

This book, therefore, is not stitched by the stitcher mechanism 85 and upon passing to the delivery mechanism, is thrown out of the machine by the switch 323, as before stated. It is obvious that any one or more of the detectors 138 will control the stitcher mechanism and the switches 323, 353 in accordance with the presence or absence of signatures on the saddles 137, and that said stitching mechanism and said switches are also controlled by the detectors in accordance with the delivery onto the saddles, of a single signature or a plurality of signatures. Moreover, both the caliper mechanism and the detectors act as a check, one on the other, thus reducing to an appreciable extent, the likelihood of imperfect books being delivered from the machine and thereby increasing the efficiency of the same.

The detector mechanism could, of course, be connected directly with the control devices for the stitchers and the delivery switches, instead of being connected with said devices through the caliper mechanism as, for example, by connecting the rod 219 directly to the arm 296. The embodiment of the invention herein described and illustrated, however, enables the caliper operated mechanism to be utilized in connection with the detector mechanism while, at the same time, providing for detection by the caliper of an assembly or assemblies of signatures which may be correct in number but of other than a predetermined thickness. For example, a perfect assembly of signatures leaving said devices might, before reaching the caliper, have one or more of the signatures displaced or removed from the assembly and the saddle 83. In this event, the caliper would detect the imperfect assembly of signatures and act through the caliper operated mechanism, to operate the stitcher and switch control devices connected therewith so that the stitchers would be stopped and the switches operated, to prevent stitching of the defective book and to throw the same out of the machine, respectively.

While one embodiment of the invention is herein described and illustrated with more or less particularity, it is to be expressly understood that the invention is not limited to said embodiment or otherwise than by the terms of the appended claims.

What is claimed is:

1. In a machine of the character described, means to be controlled, control mechanism therefor, a saddle extending to said means and along which signatures may be progressed thereto, an endless belt or chain independent of said saddle, an element carried by the belt or chain and shiftable thereon to engage the control mechanism and operate the same, and a detector controlling the shifting movement of said element and arranged to be engaged by signatures progressed along said saddle.

2. In a machine of the character described, means to be controlled, control mechanism therefor, a saddle extending to said means and along which inset groups of signatures may be progressed thereto, an endless belt or chain independent of said saddle and movable past a part of the control mechanism, an element movably mounted on said belt or chain to travel therewith, a detector adapted to be engaged by signatures progressed along the saddle, and detector controlled means adapted to position said element for engagement with said part of the control mechanism to thereby operate the same and control said first named means.

3. In a machine of the character described, means to be controlled, control mechanism therefor, a saddle extending to said means and along which signatures may be progressed thereto, a driven endless belt or chain independent of the saddle, a plurality of elements carried by said belt or chain at intervals along the same and each shiftable thereon to engage and operate said control mechanism, and a plurality of spaced detectors controlling the shifting movement of said elements and adapted to be engaged by signatures progressed along said saddle.

4. In a machine of the character described, means to be controlled, control mechanism therefor, a saddle extending to said means and along which signatures may be progressed thereto, an endless belt or chain independent of the saddle, a plurality of spaced elements movably mounted on said belt or chain to travel therewith, a plurality of means each adapted to move one of said elements so that it may engage and operate said control mechanism, and a plurality of detectors controlling the operation of said last named means and adapted to be engaged and operated by signatures progressed along said saddle.

5. In a machine of the character described, means to be controlled, control mechanism therefor, a saddle extending to said means and along which signatures may be progressed thereto, an endless belt or chain independent of the saddle, an element mounted on and traveling with the belt or chain and movable thereon in opposite directions to operative and inoperative positions respectively, a pivoted detector adapted to be engaged and operated by signatures progressed along the saddle, and means controlled by said detector for moving said element to its operative position whereby it may engage and operate the control mechanism.

6. In a machine of the character described, means to be controlled, control mechanism therefor, a saddle extending to said means and along which signatures may be progressed thereto, an endless belt or chain independent of the saddle, an element mounted on and traveling with the belt or chain and movable thereon in opposite directions to operative and inoperative positions respectively, a detector adapted to be operated by signatures on the saddle, means controlled by said detector for moving said element to its operative position whereby it may engage and operate the control mechanism, and means for thereafter moving the element to its inoperative position.

7. In a machine of the character described, means to be controlled, control mechanism therefor, a saddle extending to said means and along which signatures may be progressed thereto, an endless belt or chain independent of the saddle and movable past a part of the control mechanism, a plurality of spaced elements mounted on and traveling with the belt or chain and each movable thereon in opposite directions to operative and inoperative positions respectively, a plurality of means each adapted to move one of said elements to its operative position to engage said part of the control mechanism and thereby operate said mechanism, and a plurality of detectors controlling the operation of said last named means and each adapted to be engaged by signatures on said saddle.

8. In a machine of the character described, means to be controlled, control mechanism therefor, a saddle extending to said means and along which signatures may be progressed thereto, an endless belt or chain independent of the saddle, a plurality of spaced elements mounted on and traveling with the belt or chain and each movable thereon in opposite directions to operative and inoperative positions respectively, a plurality of devices each movable to shift one of the elements to its operative position whereby it may engage said part of the control mechanism and thereby operate the same, a plurality of detectors controlling the movement of said devices and each adapted to be engaged by signatures on said saddle, and a single means for shifting said elements to their inoperative positions.

9. In a machine of the character described, means to be controlled, control mechanism therefor, a saddle extending to said means and along which signatures may be progressed thereto, an endless belt or chain independent of the saddle, a block or holder fixed on the belt or chain to travel therewith, a pin slidably mounted on said block or holder for movement in opposite directions to operative and inoperative positions respectively, a detector adapted to be engaged by signatures on said saddle, and detector controlled means for moving the pin to its operative position whereby said pin may engage and operate said control mechanism.

10. In a machine of the character described, means to be controlled, control mechanism therefor, a saddle extending to said means and along which signatures may be progressed thereto, a continuously traveling belt or chain independent of the saddle, a block or holder fixed on the belt or chain to travel therewith, a pin slidably mounted on said block or holder for movement in opposite directions to operative and inoperative positions respectively, a detector adapted to be engaged by signatures on said saddle, and detector controlled means for moving the pin to its operative position whereby said pin may engage and operate said control mechanism.

11. In a machine of the character described, signature delivery means, control mechanism therefor, signature feeding means adapted to progress signatures toward the signature delivery means, an endless belt or chain movable past a part of the control mechanism, a block or holder fixed on the belt or chain to travel therewith, a pin slidably mounted on said block or holder for movement in opposite directions to operative and inoperative positions, means controlled through the presence or absence of signatures relative to the signature feeding means and adapted to move the pin to its operative position whereby said pin may engage said part of the control mechanism to operate said mechanism and control said signature delivery means, and means for thereafter moving the pin to its inoperative position.

12. In a machine of the character described, means to be controlled, control mechanism therefor, a saddle extending to said means and along which signatures may be progressed thereto, an endless belt or chain independent of the saddle and movable past a part of the control mechanism, a plurality of spaced blocks or holders fixed on the belt or chain to travel therewith, a plurality of pins each slidably mounted on one of the blocks or holders for movement in opposite directions to operative and inoperative positions respectively, a plurality of detectors arranged at intervals along the saddle so as to be engaged and operated by signatures thereon, a plurality of means each controlled by one of said detectors and adapted to move one of the pins to its operative position whereby said pin may engage said part of the control mechanism to operate said mechanism and control said first named means, and means for moving each of the pins to its inoperative position.

13. In a machine of the character described, means to be controlled, control mechanism therefor, a saddle along which signatures may be advanced to said means, an endless belt or chain independent of the saddle, a plurality of spaced elements mounted on the belt or chain to travel therewith and each movable to operative and inoperative positions respectively, a plurality of devices movable toward and away from the belt or chain and each adapted to shift one of the said elements to its operative position whereby it may engage said control mechanism to operate the same and control said means, cam and spring operated mechanism for moving said devices toward and away from the belt or chain, and a plurality of signature controlled detectors controlling the operation of said cam and spring operated mechanism and arranged in spaced relation along said saddle so as to be engaged by signatures thereon.

14. In a machine of the character described, means for stitching signatures, a saddle along which signatures may be progressed thereto, mechanism for controlling the operation of the signature stitching means, a driven chain independent of the saddle, a plurality of elements carried by the chain in spaced relation and each shiftable thereon to engage and operate said mechanism, a plurality of detectors arranged at intervals along the saddle and each adapted to be engaged by signatures progressed therealong, and means controlled by said detectors for shifting the elements on said chain.

15. In a machine of the character described, means for delivering signatures, a saddle along which the signatures may be progressed thereto, mechanism controlling the delivery of the signatures by said means, a driven chain independent of the saddle, a plurality of elements carried by the chain in spaced relation and shiftable thereon to engage and operate said mechanism, a plurality of detectors arranged at intervals along the saddle and each adapted to be engaged by signatures progressed therealong, and means controlled by said detectors for shifting the elements on said chain.

16. In a machine of the character described, means to be controlled, control mechanism therefor, a saddle extending to said means and along which signatures may be progressed thereto, a caliper forming part of the control mechanism, a driven chain independent of the saddle and carrying spaced elements each adapted on movement thereof to engage another part of the control mechanism to operate the same, a plurality of detectors arranged in spaced relation along the saddle and each adapted to be engaged by signatures progressed therealong, and means controlled by said detectors for moving the elements on said chain.

17. In a machine of the character described, means to be controlled, calipering mechanism controlling the operation thereof, a saddle extending to said means and along which signatures may be progressed thereto, control mechanism for the calipering mechanism, a driven chain carrying an element shiftable thereon to engage and operate said control mechanism, a detector arranged to be engaged by signatures progressed along the saddle, and means controlled by said detector for shifting the element on said chain.

18. In a machine of the character described, means to be controlled, a saddle along which signatures may be progressed thereto, calipering apparatus controlling said means, mechanism controlling said calipering apparatus, a driven chain carrying an element shiftable thereon to engage and operate said mechanism, a detector arranged to be engaged and moved by signatures progressed along said saddle, and means controlled by said detector for shifting the element on said chain.

19. In a machine of the character described, means to be controlled, a saddle along which signatures may be progressed thereto, calipering apparatus controlling said means, mechanism controlling said calipering apparatus, a driven chain independent of the saddle and carrying a plurality of spaced elements each shiftable on the chain to engage and operate said mechanism, a plurality of detectors spaced along the saddle and each adapted to be engaged by signatures progressed therealong, and means controlled by said detectors for shifting the elements on said chain.

20. In a machine of the character described, means to be controlled, a saddle along which signatures may be progressed thereto, calipering apparatus controlling said means, mechanism controlling said calipering apparatus, a driven chain carrying an element movable thereon to operative and inoperative positions, a detector adapted to be engaged by signatures progressed along said saddle, and means controlled by said detector for moving said element to its operative position whereby it may engage and operate said mechanism.

21. In a machine of the character described, means to be controlled, a saddle along which signatures may be progressed thereto, calipering apparatus controlling said means, mechanism controlling said calipering apparatus, a driven chain carrying an element movable thereon to operative and inoperative positions, a detector adapted to be engaged by signatures progressed along said saddle, means controlled by said detector for moving the chain carried element to its operative position whereby it may engage and operate said mechanism, and means for thereafter moving said element to its inoperative position.

22. In a machine of the character described, means to be controlled, a saddle along which signatures may be progressed thereto, calipering apparatus controlling said means, mechanism controlling said calipering apparatus, a driven chain carrying a plurality of spaced elements each shiftable thereon to engage and operate said mechanism, a plurality of devices each adapted to shift one of the elements on said chain, and a plurality of detectors controlling said devices and each adapted to be engaged by signatures progressed along said saddle.

23. In a machine of the character described, signature stitching means, a saddle along which signatures may be progressed thereto, calipering apparatus controlling said signature stitching means, mechanism controlling said calipering apparatus, a driven endless member carrying an element shiftable thereon to engage and operate said mechanism, a device for shifting said element, and a detector controlling said device and adapted to be engaged by signatures progressed along said saddle.

24. In a machine of the character described, signature delivering means, a saddle along which signatures may be progressed thereto, calipering apparatus controlling the delivery of signatures by said means, mechanism controlling said calipering apparatus, a driven endless member carrying an element shiftable thereon to engage and operate said mechanism, a detector arranged to be engaged by signatures progressed along said saddle, and means controlled by said detector for shifting the element on said driven endless member.

25. In a machine of the character described, means for stitching signatures, means for delivering the stitched signatures, a saddle along which signatures may be progressed past the stitching means to said delivering means, calipering apparatus controlling the stitching and delivering means, mechanism controlling said calipering apparatus, a driven endless member carrying an element shiftable thereon to engage and operate said mechanism, and a detector controlling the shifting movement of said element and adapted to be engaged by signatures progressed along said saddle.

26. In a machine of the character described, means for stitching signatures, means for delivering the stitched signatures, a saddle along which signatures may be progressed past the stitching means to said delivering means, mechanism controlling the stitching and delivering means, a driven endless member independent of the saddle and carrying an element shiftable on said member to engage and operate said mechanism, and a detector controlling the shifting movement of said element and adapted to be engaged by signatures progressed along said saddle.

27. In a machine of the character described, mechanism to be controlled, means providing for movement of signatures thereto, control means for said mechanism, a driven belt or chain independent of said first named means, an element carried by the belt or chain and shiftable thereon to operate said control means, and a signature detector controlling shifting movement of said element and arranged in the path of travel of signatures to said mechanism.

28. In a machine of the character described, mechanism to be controlled, control means therefor, a driven belt or chain, an element carried by the belt or chain and shiftable thereon to operate said control means, a device movable to shift the element whereby it may operate the control means, and a signature detector controlling movement of said device to shift the element and arranged in the path of travel of signatures to said mechanism.

29. In a machine of the character described, mechanism to be controlled, a driven belt or chain, an element carried by the belt or chain and shiftable thereon in opposite directions, a device movable to shift the element in one direction to engage and operate said control means, a signature detector controlling movement of said device to shift the element and arranged in the path of travel of signatures to said mechanism and means for shifting said element in the opposite direction.

30. In a machine of the character described, signature stitching means, control mechanism therefor, a driven belt or chain an element carried by the belt or chain and movable thereon to engage and operate said control mechanism, a device for moving the element, means for moving the device to engage it with and move said element, and a signature detector controlling the movement of said last named means and arranged in the path of travel of signatures to said signature stitching means.

31. In a machine of the character described, signature delivering means, control mechanism therefor, a driven belt or chain, a member carried by the belt or chain and movable thereon to engage and operate said control mechanism, a movably mounted device, means for moving said device to engage it with and move the member as aforesaid, and a signature detector controlling the operation of said last named means and arranged in the path of travel of signatures to said signature delivering means.

32. In a machine of the character described, mechanism to be controlled, control means therefor, a driven belt or chain, a member carried by the belt or chain and movable thereon to engage and operate said control means, a device for moving the member, and means for moving the device to engage it with and move the member as aforesaid.

33. In a machine of the character described, mechanism to be controlled, control means therefor, a driven belt or chain, a member carried by the belt or chain and movable thereon to engage and operate said control means, a device for moving the member, means for moving the device to engage it with and move said member, and a signature detector controlling the operation of said last named means and arranged in the path of travel of signatures to said mechanism.

34. In a machine of the character described, mechanism to be controlled, control means therefor, a driven belt or chain, a plurality of spaced members carried by the belt or chain and each movable thereon to engage and operate said control means, one or more devices for moving the members as aforesaid, and means for moving said device or devices to engage the same with and move said members.

35. In a machine of the character described, means to be controlled, control means therefor, a driven belt or chain, one or more members carried by the belt or chain and movable thereon to engage and operate said control means, one or more devices for moving the member or members as aforesaid, one or more mechanisms for moving said device or devices to engage the same with and move said member or members, and one or more signature detectors controlling the operation of said mechanism or mechanisms and arranged in the path of travel of signatures to said first named means.

36. In a machine of the charaacter described, mechanism to be controlled, control means therefor, a driven belt or chain, a member carried by and movable on the belt or chain to engage and operate said control means, and cam and spring operated means for moving said member.

37. In a machine of the character described, means to be controlled, a signature caliper controlling said means, a driven belt or chain, and an element carried by and movable on said belt or chain and adapted to control said signature caliper.

38. In a machine of the character described, means to be controlled, a caliper controlling the same, a driven belt or chain, an element carried by and movable on the belt or chain and adapted to control said caliper, and a signature detector controlling movement of the element on the belt or chain and arranged in the path of travel of signatures past the caliper to said means.

39. In a machine of the character described, signature delivery means, a caliper controlling the same, a driven belt or chain, and an element carried by and movable on the belt or chain and adapted to control said caliper.

40. In a machine of the character described, signature stitching means, a caliper controlling the same, a driven belt or chain, and one or more elements carried by and movable on said belt or chain and adapted to control said caliper.

In testimony whereof I have signed this specification.

EDWARD R. KAST.